United States Patent
Billerbeck et al.

(10) Patent No.: US 6,844,895 B1
(45) Date of Patent: Jan. 18, 2005

(54) WIRELESS INTELLIGENT HOST IMAGING, AUDIO AND DATA RECEIVER

(75) Inventors: Bryed Billerbeck, Mountain View, CA (US); Peter Thompson, Millbrae, CA (US)

(73) Assignee: Logitech Europe S.A. (CH)

( * ) Notice: Subject to any disclaimer, the term of this patent is extended or adjusted under 35 U.S.C. 154(b) by 0 days.

(21) Appl. No.: 09/440,827

(22) Filed: Nov. 15, 1999

(51) Int. Cl.$^7$ ............................................. H04N 5/232
(52) U.S. Cl. .................. 348/211.2; 455/66.1; 455/344; 455/207.99
(58) Field of Search ........................ 348/207.99, 207.1, 348/207.11, 211.99, 211.1, 211.2, 211.3, 211.4, 211.8, 211.11, 211.12, 222.1, 424.2, 425.1, 426.1, 720; 455/66.1, 556.1, 557, 344; 375/219, 222, 259, 240.26, 240.02; 345/552

(56) References Cited

U.S. PATENT DOCUMENTS

| | | |
|---|---|---|
| 4,081,830 A | 3/1978 | Mick et al. |
| 4,716,465 A | 12/1987 | Meyer |
| 4,777,526 A | 10/1988 | Saitoh et al. |
| 4,814,869 A | 3/1989 | Oliver |
| 5,267,033 A | 11/1993 | Hoshino |
| 5,428,388 A | 6/1995 | von Bauer et al. |
| 5,465,115 A | 11/1995 | Conrad et al. |
| 5,475,441 A | 12/1995 | Parulski et al. |
| 5,521,634 A | 5/1996 | McGary |
| 5,625,410 A | 4/1997 | Washino et al. |
| 5,793,419 A | 8/1998 | Fraley |
| 5,805,812 A | 9/1998 | Fish et al. |
| 5,896,171 A | 4/1999 | Suzuki |
| 5,903,322 A * | 5/1999 | Chen .......................... 348/723 |
| 5,953,055 A | 9/1999 | Huang et al. |
| 5,982,418 A | 11/1999 | Ely |
| 6,049,353 A | 4/2000 | Gray |
| 6,052,509 A * | 4/2000 | Abe ............................ 386/117 |
| 6,084,638 A | 7/2000 | Hare et al. |
| 6,115,137 A | 9/2000 | Ozawa et al. |
| 6,130,707 A | 10/2000 | Koller et al. |
| 6,137,538 A | 10/2000 | Caesar et al. |
| 6,157,411 A | 12/2000 | Williams et al. |
| 6,161,933 A | 12/2000 | Tschida et al. |
| 6,167,469 A | 12/2000 | Safai et al. |
| 6,243,772 B1 | 6/2001 | Ghori et al. |
| 6,480,671 B2 * | 11/2002 | Takahashi et al. ........... 386/117 |
| 6,522,352 B1 * | 2/2003 | Strandwitz et al. ....... 348/211.2 |
| 6,573,938 B1 * | 6/2003 | Schulz et al. ................ 348/373 |
| 6,628,326 B1 * | 9/2003 | Manico et al. .......... 348/211.12 |

OTHER PUBLICATIONS

Null "Like to Watch, a do–it–yourself security system for your PC—without wires," PC Computing 12:126 (1999).

* cited by examiner

*Primary Examiner*—Tuan Ho
(74) *Attorney, Agent, or Firm*—Townsend and Townsend and Crew LLP

(57) ABSTRACT

A system which marries a tethered, digital bus with image broadcasting to allow multiple, low-cost cameras to communicate with a host. This is done by using an external receiver on a tethered bus, and by putting much of the processing circuitry in the receiver, rather than the camera. The broadcasting can be either a NTSC/PAL type of analog broadcasting or a digital broadcasting technique. The camera can be made with low cost, readily available NTSC/PAL, other analog video components, or with readily available digital telephone components. The external receiver unit of the present invention does all the necessary data processing and compression to fit the available bandwidth of the bus to which it is communicating, and provides for a low cost and extensible method of inputting digital image data into a personal computer (PC) or other host.

23 Claims, 5 Drawing Sheets

WIRELESS INTELLIGENT HOST IMAGING, AUDIO AND DATA RECEIVER

BACKGROUND OF THE INVENTION

The present invention relates to digital imaging devices, and in particular wireless video cameras in communication with a host.

The advancements in the telecommunications industry are focused on one front on the ability to take and store both still and video digital images. On another front, the telecommunications revolution is focused on the general increase in usability and the number of communications devices that are capable of simultaneously transmitting and receiving combined image, audio, and data signals. And yet another set of advancements are focused on various implementations for wireless connectivity. For example, digital images, audio, and data are routinely manipulated on a computer, and transferred over a network or the internet. Video conferencing is another application where digital images, sound and data are simultaneously transmitted and received from one station to another.

FIG. 1 depicts a prior art generic wireless system used for the simultaneous transmission of digital images and sound from a video camera 10 to a television or a VCR 12. In such a system the images and the sound are transmitted using a classic analog base band television signal standard such as the NTSC or PAL standards. Such a configuration is common for security systems, for example. One such system is shown in U.S. Pat. No. 5,448,290. This NTSC based system relies on the camera or the broadcast device to handle the image sensing, the sound recording, all the necessary signal processing, the conversion to an NTSC format signal and transmitting the signal to the television or the VCR. The television or the VCR (the host) in such a system does not need to be customized to work with the system and any television or VCR will function properly so long as the camera sends the proper NTSC format signal to a television or VCR host. Because the PAL/NTSC format is a common standard, low cost commodity parts are available. For example, a NTSC/PAL Digital Video Encoder core is available from IBM Microelectronics which converts digital component video into a standard baseband television signal with a modulated color subcarrier.

FIG. 2 depicts a prior art generic digital tethered system for transmitting images and sound from a digital camera to an external bus which is connected to a PC host. In such a system light is received through a lens and provided to an array, such as a CMOS or a charged couple device (CCD) sensor array. The detected signals are then processed and converted into digital form and passed to a processing circuit which digitally manipulates the images, and may be a programmed processor or an application specific integrated circuit (ASIC). The processing circuit provides the image and voice data via a bus 22 to a computer 24. The camera 20 in such a system includes both the lens and the processing circuit. The processing includes compression of the video data for transmission over the limited bandwidth of the bus. In addition to compression, preprocessing may be done on the video data to limit the amount of data that needs to be compressed. In addition, some color processing may be done before compression, to avoid the loss of quality if color processing is done in the host after compression and subsequent decompression. An example of such a system is the Logitech® QuickCam® Pro video camera which connects to a universal serial bus (USB) or a parallel port.

Tethered connections can be avoided by using wireless digital communication where the data rate is low. Various manufacturers have produced wireless keyboards and mice and their corresponding receivers based on either infrared or digital radio technologies. However, such devices transmit at bandwidths and data rates that are extremely low when compared to the required data transfer rates for audio and imaging peripheral devices.

In an effort to proliferate short-range wireless connectivity, the Bluetooth Technology consortium is in the process of developing Bluetooth, which is a specification for a protocol for wireless data and voice communications. In particular, it is intended to be a common protocol for cellular phones, laptop computers, PDA's, FAX machines, keyboards, joysticks and headsets. Bluetooth operates in an ISM radio band at 2.4 GHz with a gross data rate of 1 Mb/s. Once it is fully developed, the Bluetooth specification will eventually be implemented on the motherboard.

SUMMARY OF THE INVENTION

The present invention marries a tethered, digital bus with image broadcasting to allow multiple, low-cost cameras to communicate with a host. This is done by using an external receiver on a tethered bus, and by putting much of the processing circuitry in the receiver, rather than the camera. The broadcasting can be either a NTSC/PAL type of analog broadcasting or a digital broadcasting technique. The camera can be made with low cost, readily available NTSC/PAL, other analog video components, or with readily available digital telephone components. The external receiver of the present invention provides for a low cost and extensible method of inputting digital image data into a personal computer (PC) or other host.

The camera transmits to the receiver without having to take into account the available bandwidth of the host bus. In this manner the camera simply senses and transmits the image. The elimination of signal processing circuitry from the camera reduces the cost and size of the video camera circuitry. The receiver unit does all the necessary data processing and compression to fit the available bandwidth of the bus to which it is communicating.

With the camera broadcasting in a NTSC/PAL analog format, the conversion into digital form can be done at the receiver. Or, since standard NTSC/PAL parts are available for digital video, the camera can convert into digital, then use the standard parts to convert to the NTSC/PAL format for broadcasting. The receiver unit can then convert back into digital for transmission over a digital bus. Alternately, the camera can convert the image into and also broadcast it in a digital format, and hence not require the receiver unit to convert the broadcast signal back to digital. In the United States, the transmission can use the low power broadcast bands available under FCC regulations above 900 MHz. Since 46 MHz channels are available, multiple cameras can communicate in parallel with a single receiver. Alternately, or in addition, more cameras can be connected by using any multiplexing such as time-division multiplexing to select a particular camera.

The use of the standard PAL/NTSC format allows network extensibility. Interoperation with many existing applications is possible, such as Set Top Boxes (STBs) for cable and satellite television reception, game stations and other intelligent devices.

The use of the standard PAL/NTSC format also allows high quality wireless digital image transmission, compared to the lossy compression techniques often used for digital transmissions. The processing required prior to transmission is minimized.

Alternately, the use of available standard digital telephone parts can provide cost savings due to avoiding the initial encoding to analog at the broadcast device and the subsequent decoding of the broadcast signals into digital at the receiver unit.

For a further understanding of the nature and advantages of the present invention, reference should be made to the following description in conjunction with the accompanying drawings.

DESCRIPTION OF THE SPECIFIC EMBODIMENTS

Figure 1:
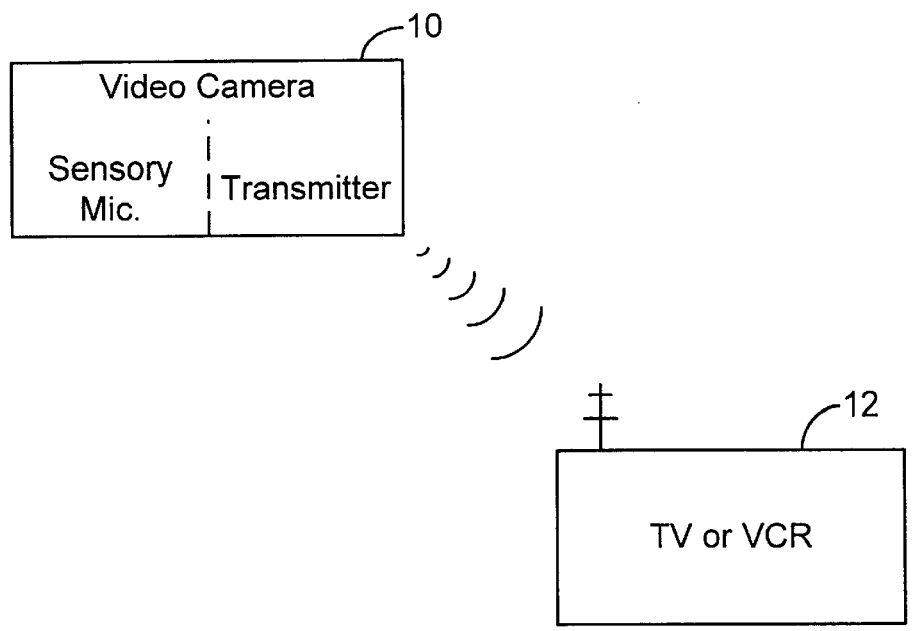
FIG. 1 is a block diagram of a prior art wireless system for transmission of images and sound from a video camera to a television or a VCR.
Figure 2:
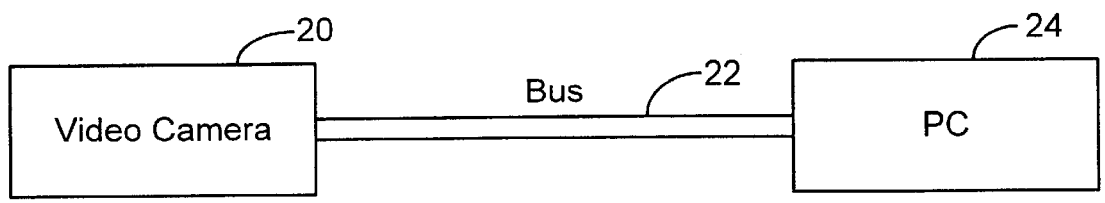
FIG. 2 is a block diagram of a prior art tethered system for transmission of images and sound from a video camera to a personal computer (PC) host.
Figure 3:
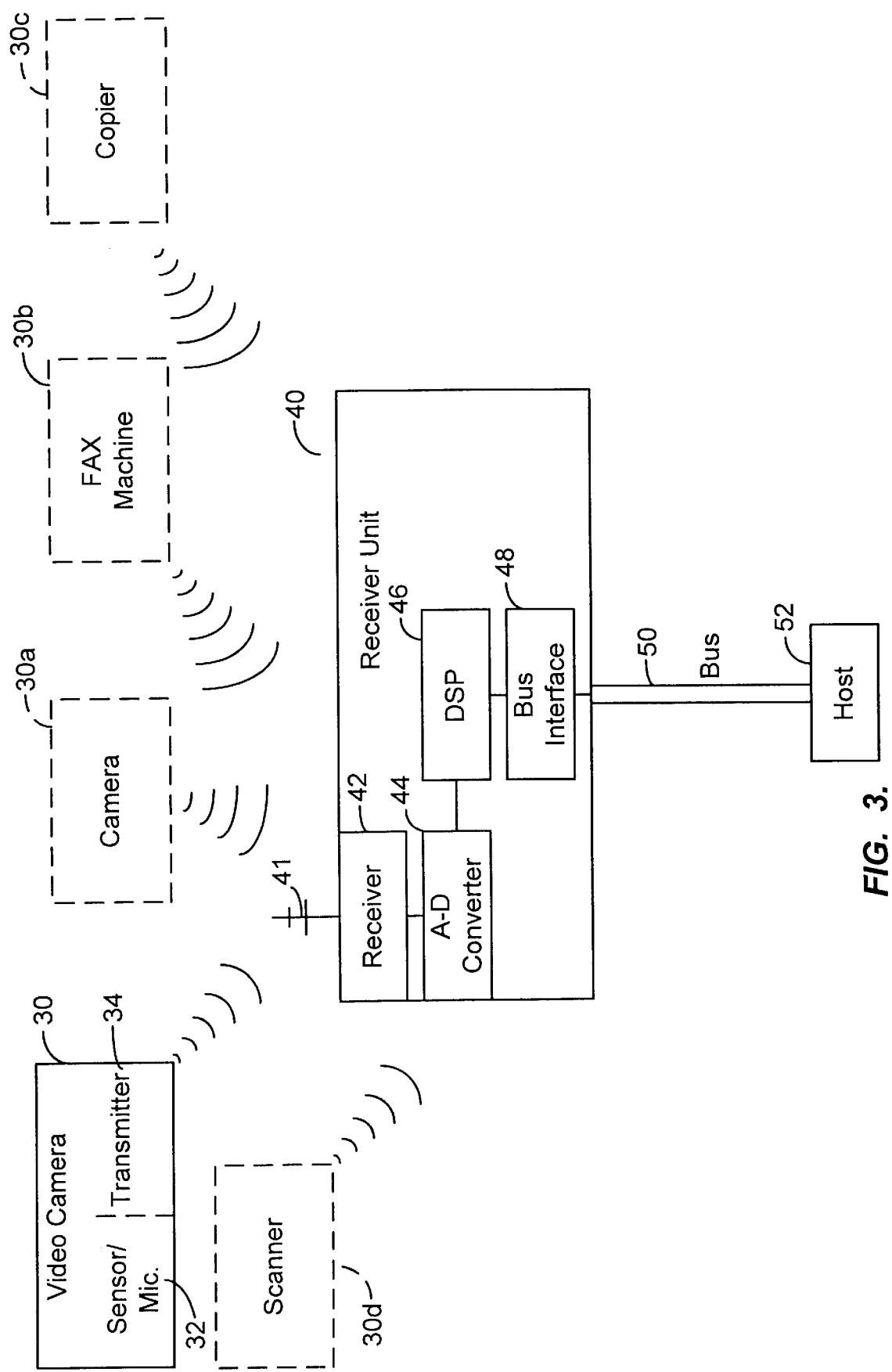
FIG. 3 is a block diagram of one embodiment of the present invention for wireless transmission and reception of images, sound and data from a video camera to a receiver unit.

FIG. 3 is a block diagram of a wireless system for transmission and reception of images, sound and data from a video camera 30 to a receiver unit 40 which is tethered to a host 52 via a bus 50 according to one embodiment of the present invention. This system includes a broadcast device or a camera unit 30 and a receiver unit 40. The camera unit 30 receives as input image, audio and data, converts their respective signals to an analog format (or leaves them in an analog format) and broadcasts them to the receiver unit. The receiver unit 40 receives the broadcast signals, converts them to digital format, and does the necessary processing to fit the bandwidth of the bus to which it is communicating. In addition to camera 30, the system may include a second camera 30a, and additional devices such as a FAX machine 30b, a copier 30c, and a scanner 30d.

As can be seen in FIG. 3, one embodiment of the camera unit is comprised of two sub units, which can be two semiconductor chips. One sub unit performs the function of sensing the digital image, and the second sub unit performs the transmission function. The first sub unit may also include a microphone and a control circuit which generates control data for transmission.

FIG. 3 illustrates the main sub units of one embodiment of the receiver unit 40. These are an antenna 41, a receiver 42, an analog to digital converter (ADC) 44, a digital signal processor (DSP) 46, and a bus interface unit 48. Antenna 41 receives the analog format broadcast signal from the camera unit 30. The broadcast signal is passed to the receiver 42 to down convert it to an intermediate frequency and demodulate the signal back to its separate image, audio and data base band signal portions. The base band analog signals are converted to digital format signals by the ADC 44, which passes the digital format signals to a DSP 46 which performs one or more of the compression, cropping, scaling, color processing and other functions on the data, as well as digital filtering. Once processed, the digital signal is provided to a bus interface 48. The bus interface 48 receives the digital signal from the DSP 46 and processes it to fit the bandwidth of the bus 50 to which it is communicating. Bus 50 transmits the signals processed by the DSP 46 to a host processor 52 which will respond to the transmitted data signal, and/or display the digital image signal and/or playback the transmitted audio signal.

In one example, a broadcast frequency of 65.5 MHz (Channel 3) is used for the video camera 30, with other frequencies (Channels 1, 2 and 4) being used for the other broadcast devices. The transmitter includes a mixer which varies its center frequency between 907 MHz and 925 MHz. The receiver down converts to an intermediate frequency of 45 Mhz.

In one embodiment, referred to as an external receiver embodiment, the bus 50 is a universal serial bus (USB), or an IEEE 1394 bus (such as Apple's trademarked FireWire® bus) or a parallel port. Alternately, in an imbedded receiver embodiment, the –20 bus is an inter integrated circuit (IIC) bus.

The various embodiments of the host 52 include typical processors such as: a personal computer (PC), a television set top box (STB), a network computer, a workstation, a server, a router, a switch, a hub, a bridge, a printer, a copier, a scanner, a fax machine, a modem, a network appliance, a game station, or any device where image, audio and data are displayed, further processed, viewed, hard copied or distributed over a network. Instead of a camera, the invention could receive broadcast signals from a scanner, copier, FAX machine, photographic processor or any other device which receives, processes, or simply retransmits an image.

Figure 4:
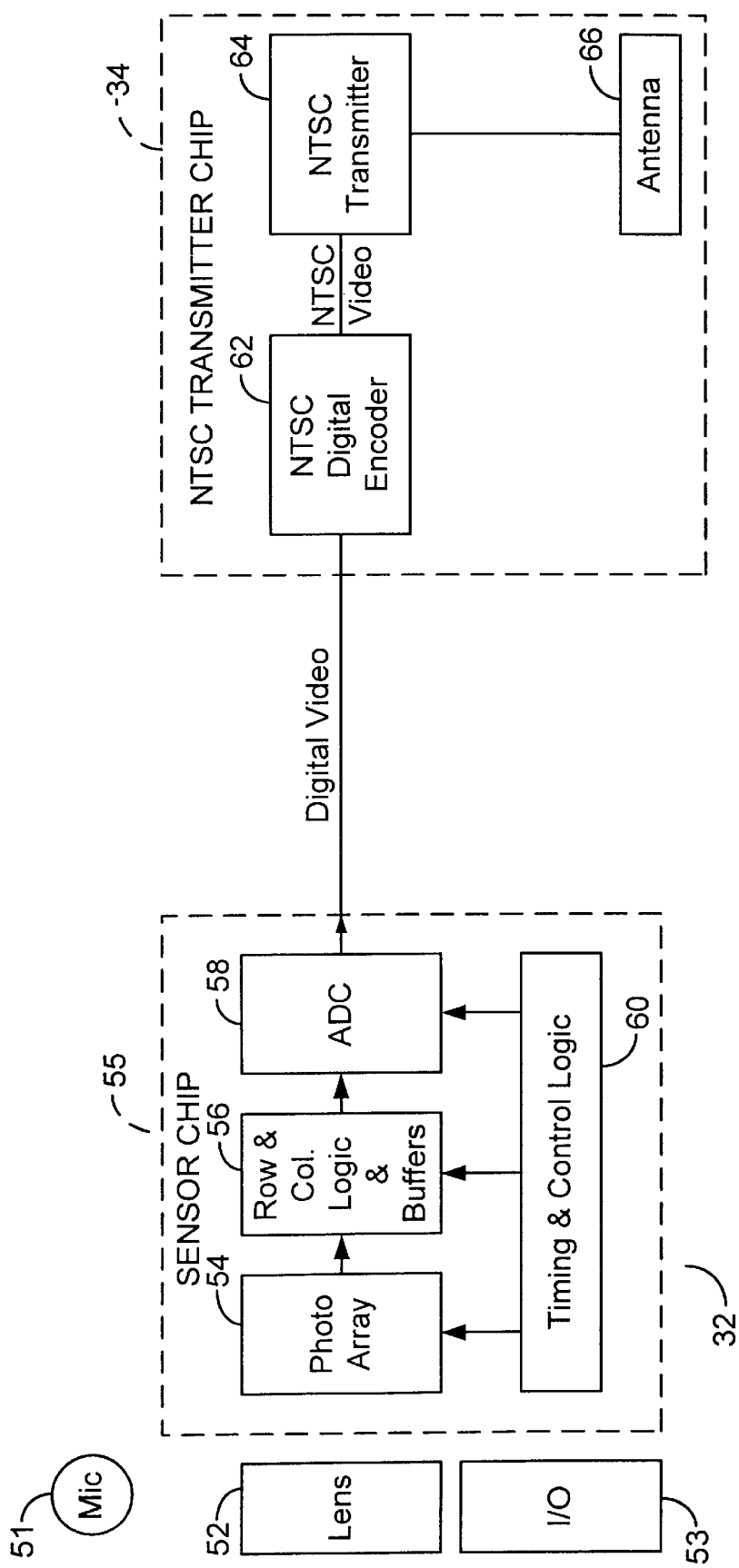
FIG. 4 is a block diagram of one embodiment of a wireless transmitting video camera unit of FIG. 3.

FIG. 4 is a block diagram of a video camera unit according to one embodiment of the present invention. This system includes a sensor unit 32 and a transmitter chip 34. In this embodiment the sensor unit 32 provides a digital signal to the transmitter chip 34 which broadcasts the signal in a PAL/NTSC standard format. The sensor unit 32 includes a sensor chip 55, a microphone 51, and a lens 52. Sensor chip 55 includes a photo array 54 such as a CMOS or a CCD sensor array and a logic block 56. Logic block 56 includes a row and column decoder, digital control buffers, and row logic. Array timing and control logic 60 controls the operation of the array. Also, an ADC 58 is preferably integrated on the sensor chip 55. Logic block 56 receives the value from a photo site on the photo array once a capacitance associated with each photosite has been charged up with an image, and serially shifts that data out through the ADC 58 to the transmitter chip. Also provided is a general purpose input output (I/O) port 53. The microphone and the general purpose I/O signals also pass through the ADC to the transmitter chip 34.

Figure 5:
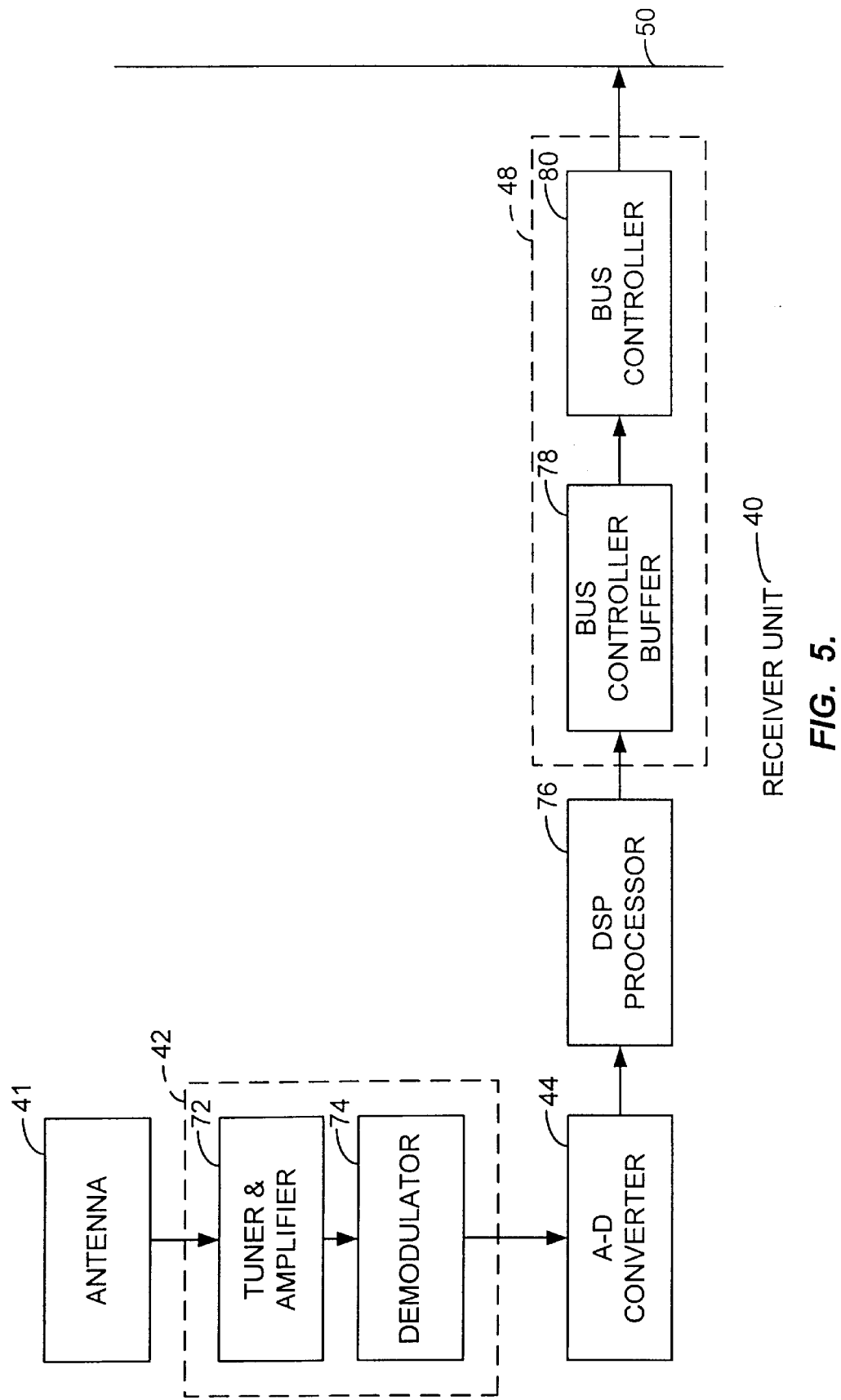
FIG. 5 is a block diagram of a wireless receiver unit of FIG. 3.

The PAL/NTSC transmitter chip 34 receives the digital signals from the sensor chip 55, and transmits them in analog PAL/NTSC format to the receiver unit 40 shown in FIGS. 3 and 5. The digital format image, audio, and data signals are converted by the NTSC digital encoder 62 to analog formats for transmission to a NTSC transmitter 64 which is configured to generate, amplify, and shape the radiofrequency energy which is delivered to an antenna 66. Antenna 66 radiates the NTSC signal out into space to be received by a receiver unit 40 shown in FIGS. 3 and 5. PAL/NTSC transmitter chips are commercially available in large volumes, and thus low costs. In addition, such chips handle all timing and control of input blocks, so sensor data output can be matched exactly with the PAL/NTSC chip output. This eliminates the need for a memory buffer in the camera to buffer the sensor output data.

FIG. 5 is a more detailed block diagram of the receiver unit according to one embodiment of the present invention. The receiver antenna 41 receives the NTSC format signals broadcast by the NTSC transmitter chip 34. The received signal then passes through a tuner and an amplifier 72 and then through a demodulator 74 where the received signal is decomposed to its original base band image, audio and data portions. The three base band signals are then forwarded to an ADC 44 to convert the base band signals into digital form. The signals are then forwarded to a DSP 76 which performs the compression, cropping, scaling and other functions on the data, as well as digital filtering. Once processed, the digital signal is provided to a bus interface 48.

Bus interface 48 couples the DSP 76 to the bus 50. The bus interface 48 includes a bus controller buffer 78 and a bus controller 80. Bus controller buffer 78 stores a portion of the data and bus controller 80 controls the rate of transfer of data to the bus. Therefore, the bus interface 48 and the DSP 76 function together to process the data for an optimal bus bandwidth utilization. For more details of this processing, reference is made to a copending application of the same assignee, Ser. No. 09/346,561, filed Jun. 30, 1999, entitled "Video Camera Without Frame Buffer" and hereby incorporated herein by reference.

Figure 6:
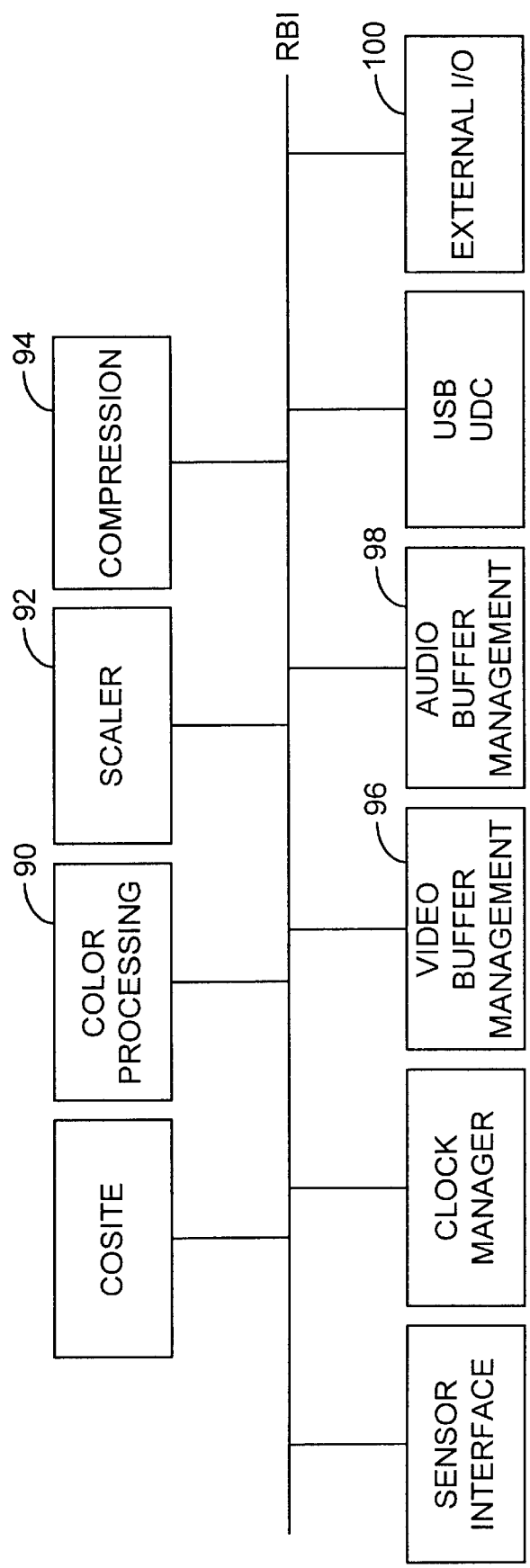
FIG. 6 is a block diagram of one embodiment of a digital signal processor (DSP) of FIG. 5.

FIG. 6 illustrates the main components of one embodiment of the DSP 76 of FIG. 5. The DSP includes buffers for the image, audio, and external peripheral I/O signals as well as circuits for image signal processing. Block 90 is a circuit which extracts YUV information from the video signal and converts it into RGB format (YUV is the native signal format for analog video, used in the PAL/NTSC formats, in which Y is luminance, U is red minus Y, and V is blue minus Y. To display images on a computer monitor which expects digital image data, the YUV data must be converted to RGB.) Block 90 is followed by a scaler 92, which transforms the image to fit the desired X and Y scales. Block 96 manages the video buffer and block 98 is a circuit which processes and manages the audio buffer. The bus controller buffer 78 of FIG. 5 is used for image, audio and control data. The video and audio buffer management units manage their respective parts of this buffer, or multiplex the management of the same portions of the buffer. Alternately, additional buffers could be added. Block 94 is the circuit used to compress the image and audio data. Block 100 processes the general peripheral I/O data.

Referring to FIG. 5, when the system is in operation, bus controller 80 will negotiate with the bus 50 to obtain a certain amount of bandwidth. Once this amount of bandwidth has been determined, the DSP 76 working in conjunction with the bus controller buffer 78 will establish the data size and the data transfer rates to accommodate the available bandwidth.

An alternate embodiment of the present invention for wireless transmission to a receiver unit broadcasts the image, sound and control data in digital form to a receiver, which receives this digital format data and performs all the necessary processing to fit the bandwidth of the bus to which it is communicating. Such an embodiment replaces the NTSC transmitter chip and its DAC with a digital transmitter chip, and eliminates the ADC from the receiver unit. The advantage of a digital format broadcast system is that it avoids the encoding to analog in the transmitter and the subsequent decoding of the broadcast signal in the receiver unit. Avoiding this additional encoding and decoding will save costs and improve signal quality. Moreover, a digital transmission system can take advantage of the prevalence of digital phone system components.

As will be understood by those skilled in the art, the present invention may be embodied in other specific forms without departing from the essential characteristics thereof. For example, a sensor other than a CMOS sensor could be used, such as a CCD sensor. Alternately, a broadcast format other than a NTSC format could be used, such as a PAL broadcast format, an RGB digital format, or any other color space format. These other embodiments are intended to be included within the scope of the present invention which is set forth in the following claims.

What is claimed is:

1. A system for wireless transmission and reception of digital images, said system comprising:
   a) a transmitter unit for transmitting a digital image, including
      an encoder to convert said digital image to a broadcastable signal for transmission;
      a transmitter, coupled to said encoder, to process said broadcastable signal and configured to generate radiofrequency energy for transmission;
      a transmitting antenna, coupled to said transmitter, for radiating out into space said radiofrequency energy; and
   b) a receiver unit for wirelessly receiving radiated signals, said receiver unit comprising:
      a receiving antenna for receiving said radiated signals;
      a receiver, coupled to said receiving antenna, and configured to tune and demodulate said radiated signals to an original baseband image signal;
      a digital signal processor (DSP), coupled to said receiver, and configured to process said original baseband image signal for optimal bus bandwidth utilization to provide digital output signals; and
      a bus interface device coupled to said DSP, wherein said bus interface device comprises a bus controller buffer memory unit for storing a portion of said baseband image signals and a bus controller unit being programmed to control the rate of transfer of said digital output signals from said DSP to said bus;
   c) a bus, coupled to said bus interface device for transmitting said digital output signals; and
   d) a host, coupled to said bus, for receiving said digital output signals.

2. The system of claim 1 wherein said broadcastable signal is an analog broadcast signal.

3. The system of claim 1 wherein said broadcastable signal is a digital broadcast signal.

4. The system of claim 1 wherein said transmitter unit includes a camera including an image sensor array.

5. The system of claim 1 wherein said transmitter unit includes a microphone.

6. The system of claim 1 wherein said transmitter unit includes a general purpose input/output (I/O) port.

7. The system of claim 1 wherein said encoder of said transmitter unit is one of (a) a NTSC/PAL digital encoder and (b) a RGB digital encoder.

8. The system of claim 1 wherein said receiver of said receiver unit comprises a tuner and amplifier unit and a demodulator unit.

9. The system of claim 1 further comprising a second transmitter unit configured to transmit image signals to said same receiver unit.

10. The system of claim 1 wherein said bus is one of (a) a universal serial bus (USB), (b) an inter integrated circuit (IIC) bus, (c) an IEEE 1394 bus, (d) a parallel port, (e) an enhanced parallel port (EPP) and (f) an extended capabilities port (ECP).

11. A system for wireless transmission and reception of digital images and corresponding audio signals, and data, said system comprising:
- a) a digital imaging device unit for sensing and transmitting image, audio and data signals, said camera unit further comprising:
  - i) an image sensor array to generate a digital image signal, wherein said image sensor is one of (a) a CMOS sensor array and (b) a CCD sensor array;
  - ii) a microphone to generate an audio signal;
  - iii) a general purpose I/O port to process peripheral device data signals;
  - iv) an encoder to convert said image, audio, and data signals to broadcastable image, audio, and data for transmission, wherein said encoder is one of (a) a NTSC/PAL digital encoder and (b) a RGB digital encoder;
  - v) a transmitter coupled to said encoder to process said broadcastable image, audio, and data and configured to generate, amplify, and shape radiofrequency energy for transmission;
  - vi) a transmitting antenna, coupled to said transmitter for radiating out into space said radiofrequency energy; and
  - vii) timing and control logic, coupled to said image sensor array, and configured to provide a clock signal to said image sensor array to transfer image data from said image sensor array to said encoder,
- b) a receiver unit for wirelessly receiving radiated signals, said receiver unit further comprising:
  - i) a receiving antenna for receiving said radiated signals;
  - ii) a receiver, coupled to said receiving antenna, and configured to tune, amplify and demodulate said radiated signals to original baseband image, audio, and data signals, wherein said receiver of said receiver unit comprises a tuner and amplifier unit and a demodulator unit;
  - iii) a DSP, coupled to said receiver, and configured to process said original baseband image, audio and data signals for optimal bus bandwidth utilization to provide digital output signals; and
  - iv) a bus interface device coupling said DSP to a bus, wherein said bus interface device of said receiver unit comprises a bus controller buffer memory unit for storing a portion of said digital output signals and a bus controller unit being programmed to control the rate of transfer of said digital output signals from said DSP to a bus;
- c) a bus coupled to said bus interface device for transmitting said digital output signals, wherein said bus is one of (a) a universal serial bus (USB), (b) an inter integrated circuit (IIC) bus, (c) an IEEE 1394 bus, (d) a parallel port, (e) an enhanced parallel port (EPP) and (f) an extended capabilities port (ECP), and
- d) a host coupled to said bus, for receiving said digital output signals.

12. A wireless receiver unit for wirelessly receiving digital images, said receiver unit comprising:
- an antenna for receiving radiated signals;
- a receiver coupled to said antenna, and configured to tune, amplify and demodulate said radiated signals to original baseband image signals;
- a digital signal processor (DSP) coupled to said receiver, and configured to process said baseband image signals for optimal bus bandwidth utilization to produce digital output signals; and
- a bus interface unit, coupled to said DSP, for coupling said DSP to a bus,
- wherein said bus interface unit of said receiver unit comprises a bus controller buffer memory unit for storing a portion of said baseband image signals and a bus controller unit being programmed to control the rate of transfer of said digital output signals from said DSP to said bus.

13. The wireless receiver unit of claim 12 wherein said receiver comprises a tuner and amplifier unit and a demodulator unit.

14. The wireless receiver unit of claim 12 wherein said radiated signals are analog broadcast signals.

15. The wireless receiver unit of claim 12 wherein said radiated signals are digital broadcast signals.

16. A wireless receiver unit for wirelessly receiving image and corresponding audio signals, and data, said receiver further comprising:
- an antenna for receiving radiated signals;
- a receiver coupled to said antenna, and configured to tune, amplify and demodulate said radiated signals to original baseband image, audio, and data signals, wherein said receiver comprises a tuner and amplifier unit and a demodulator unit;
- a DSP coupled to said receiver, and configured to process said baseband image, audio and data signals for optimal bus bandwidth utilization; and
- a bus interface unit coupling said DSP to a bus, wherein said bus interface unit of said receiver unit comprises a bus controller buffer memory unit for storing a portion of said baseband image, audio, and data signals and a bus controller unit being programmed to control the rate of transfer of said baseband image, audio, and data signals from said DSP to said bus.

17. The wireless receiver unit of claim 16 wherein said bus is one of (a) a universal serial bus (USB), (b) an inter integrated circuit (IIC) bus, (c) an IEEE 1394 bus, (d) a parallel port, (e) an enhanced parallel port (EPP) and (f) an extended capabilities port (ECP).

18. A method for operating a wireless imaging system comprising:
- collecting digital image data in a peripheral device;
- converting said digital image data to a broadcastable image data format;
- broadcasting said digital image data, the digital image data having been encoded prior to the broadcasting step;
- receiving said digital image data at a receiver;
- demodulating said digital image data by said receiver to original baseband image signals;
- processing of said baseband image signals in a digital signal processor (DSP) to produce processed image data optimized for transfer over a bus; and
- providing said processed image data to a bus at a rate corresponding to a data transfer rate of said bus,
- wherein said processed image data are transferred to said bus via a bus interface device that comprises a bus controller buffer memory unit for storing a portion of said baseband image signals and a bus controller unit being programmed to control the rate of transfer of said processed image data from said DSP to said bus.

19. The method of claim 18 further comprising broadcasting a second image data from a second peripheral device to said same receiver.

20. The method of claim 18 wherein said broadcastable image data format is one of (a) a NTSC/PAL format and (b) a RGB format.

21. The method of claim 18, herein said bus is one of (a) a universal serial bus (USB), (b) an inter integrated circuit (IIC) bus, (c) an IEEE 1394 bus, (d) a parallel port, (e) an enhanced parallel port (EPP) and (f) an extended capabilities port (ECP).

22. The method of claim 18 wherein said broadcasting is an analog broadcasting.

23. The method of claim 18 wherein said broadcasting is a digital broadcasting.

* * * * *